United States Patent
Wu

(10) Patent No.: US 10,273,344 B1
(45) Date of Patent: Apr. 30, 2019

(54) FUSER COMPONENT COMPRISING FLUORINATED BORON NITRIDE NANOSHEETS

(71) Applicant: XEROX CORPORATION, Norwalk, CT (US)

(72) Inventor: Jin Wu, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 15/887,582

(22) Filed: Feb. 2, 2018

(51) Int. Cl.
| | | |
|---|---|---|
| *C08K 3/28* | (2006.01) | |
| *G03G 15/20* | (2006.01) | |
| *C01B 21/072* | (2006.01) | |
| *C01B 21/064* | (2006.01) | |
| *C01B 32/20* | (2017.01) | |
| *C08L 79/08* | (2006.01) | |
| *G03G 7/00* | (2006.01) | |
| *C08J 3/02* | (2006.01) | |

(52) U.S. Cl.
CPC .............. *C08K 3/28* (2013.01); *C01B 21/064* (2013.01); *C01B 21/072* (2013.01); *C01B 32/20* (2017.08); *C08J 3/02* (2013.01); *C08L 79/08* (2013.01); *G03G 7/0046* (2013.01); *G03G 15/2028* (2013.01); *C01P 2004/04* (2013.01); *C08J 2379/08* (2013.01); *C08K 2003/282* (2013.01)

(58) Field of Classification Search
None
See application file for complete search history.

(56) References Cited

U.S. PATENT DOCUMENTS

| | | | |
|---|---|---|---|
| 9,244,406 B2 | 1/2016 | Qi et al. | |
| 9,274,469 B2 | 3/2016 | Zhang et al. | |
| 9,441,131 B2 | 9/2016 | Qi et al. | |
| 9,529,312 B2 | 12/2016 | Wu et al. | |
| 2003/0035667 A1* | 2/2003 | Izawa ................ | G03G 15/2053 399/333 |
| 2010/0189477 A1* | 7/2010 | Yamada ............. | G03G 15/2064 399/329 |
| 2015/0177654 A1* | 6/2015 | Arizumi .............. | G03G 15/206 399/333 |
| 2015/0316881 A1* | 11/2015 | Aiba .................. | G03G 15/2064 399/329 |
| 2017/0343936 A1* | 11/2017 | Wu ..................... | G03G 15/2057 |
| 2018/0039211 A1* | 2/2018 | Wu ..................... | G03G 15/2057 |
| 2018/0107140 A1* | 4/2018 | Wu ..................... | G03G 15/2057 |

OTHER PUBLICATIONS

Radhakrishnan, Sruthi et al., "Fluorinated h-BN as a magnetic semiconductor," Science Advances Research Article, Jul. 14, 2017; 3: e1700842, 8 pages.

* cited by examiner

*Primary Examiner* — Sevan A Aydin
(74) *Attorney, Agent, or Firm* — MH2 Technology Law Group LLP

(57) ABSTRACT

An electrophotographic component includes a substrate and an optional cushioning layer disposed on the substrate. The optional cushioning layer comprises a material selected from the group consisting of silicones, fluorosilicones and fluoroelastomers. An optional release layer is disposed on the substrate and if present, on the optional cushioning layer. The optional release layer comprises a fluoropolymer. The substrate, the optional cushioning layer, the optional release layer, or any combination thereof, comprise a plurality of fluorinated boron nitride nanosheets. The electrophotographic component comprises at least one layer selected from the optional cushioning layer and the optional release layer.

20 Claims, 4 Drawing Sheets

FUSER COMPONENT COMPRISING FLUORINATED BORON NITRIDE NANOSHEETS

DETAILED DESCRIPTION

Field of the Disclosure

This disclosure is generally directed to fuser components and endless belts useful, for example, in electrophotographic imaging and other printing apparatuses, the fuser components comprising fluorinated boron nitride nanosheets.

BACKGROUND

In the electrophotographic printing process, a toner image can be fixed or fused upon a support (e.g., a paper sheet) using a fuser member or transfix member. Such fuser or transfix members often include polymer (e.g., polyimide) substrates, referred to as belts, as a support layer. In addition, fusing members and transfix members can have one or more additional polymer layers, such as release layers for providing improved release of toner; and cushioning layers for providing desired resiliency and elasticity. Materials used for belts, release layers and cushioning layers can have rigid requirements with respect to such things as modulus of elasticity, durability, onset decomposition temperature and so forth. Further, the polymeric materials from which the belts and other layers are made typically have a low thermal conductivity near room temperature, which can be undesirable.

Current efforts in electrophotographic component development are aimed at improving the physical properties and thermal conductivity of belt substrates and other polymeric fuser and/or transfix members. Additionally, efforts are also underway to improve the release properties of the surface layers of fuser and transfix members to avoid problems, such as toner offset.

Metal and ceramic fillers have been incorporated into polymeric materials to enhance thermal conductivity of fuser and transfix members. However, incorporation of metal and ceramic fillers into polymeric material can undesirably decrease the Young's modulus of polymeric material. Further, such fillers generally do not improve, and may be detrimental to, release properties of fuser surface layers. To improve release properties, fuser release oil (e.g., silicone oil, such as am inofunctional silicone oil) is often applied to the surface of fuser members during the fusing process to avoid the problem of toner offset. However, the use of such release oil increases the cost and complexity of the electrophotographic process. Additionally, amino functional release oil can chemically react with surface layers and toner ingredients, thereby initiating and/or leading to image offset failure.

Boron nitride (BN) powder is known to improve thermal conductivity for polymeric materials generally, including polyimide. However, the crystal structure of boron nitride leads to inherent anisotropy in the material and hence several physical properties, such as thermal conductivity, coefficient of expansion, refractive index, etc., are different in the a-b plane versus the c-direction. This anisotropy is most notable in thermal conductivity where the in-plane thermal conductivity (i.e. in the a-b plane) is estimated to be as high ~300 W/mK, while the through-plane (in the c-direction) thermal conductivity is less than 10 W/mK. Due in part to the anisotropic character of BN, the effects of incorporation of the BN powder into polyimide to improve thermal conductivity have not been as significant as anticipated. For example, while BN powder is known to have increased thermal conductivity in polyimide, it does so with very high concentration (e.g., above 20%) due to its inefficiency from anisotropic conduction. In addition, boron nitride is not generally known for improving release properties in electrophotographic components, such as fusers or transfix members.

It would be desirable to provide novel polymer composite materials suitable for use in fuser belts and other electrophotographic component layers having higher thermal conductivity, high thermal diffusivity and/or a high Young's modulus. Additionally, fillers that can improve release properties of fuser and/or transfix members and/or that can allow for reduced amounts of release oil and/or and an oil-less fusing process would also be desirable.

SUMMARY

An embodiment of the present disclosure is directed to an electrophotographic component. The electrophotographic component comprises a substrate and an optional cushioning layer disposed on the substrate. The optional cushioning layer comprises a material selected from the group consisting of silicones, fluorosilicones and fluoroelastomers. An optional release layer is disposed on the substrate and if present, on the optional cushioning layer. The release layer comprises a fluoropolymer. The substrate, the optional cushioning layer, the release layer, or any combination thereof, comprise a plurality of fluorinated boron nitride nanosheets. The electrophotographic component comprises at least one layer selected from the optional cushioning layer and the optional release layer.

Another embodiment of the present disclosure is directed to an endless belt. The endless belt comprises a polymer and a plurality of fluorinated boron nitride nanosheets dispersed in the polymer.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrates embodiments of the present teachings and together with the description, serve to explain the principles of the present teachings.

Figure 1:
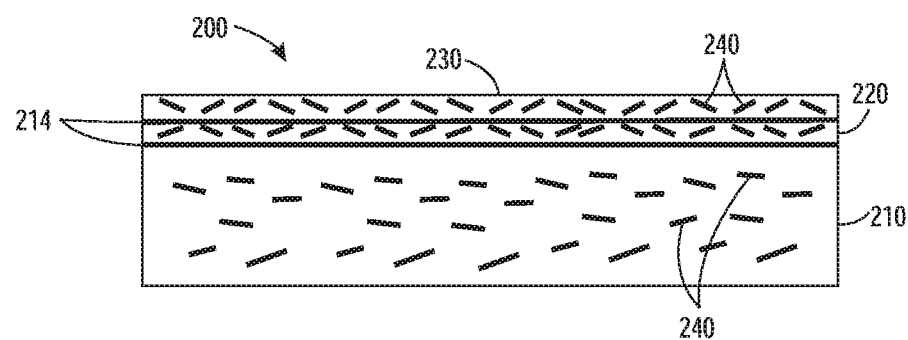
FIG. 1 depicts a schematic, cross-sectional view of an electrophotographic component, according to an embodiment of the present disclosure.

It should be noted that some details of the figure have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. In the drawings, like reference numerals have been used throughout to designate identical elements. In the following description, reference is made to the accompanying drawing that forms a part thereof, and in which is shown by way of illustration a specific exemplary embodiment in which the present teachings may be practiced. The following description is, therefore, merely exemplary.

An embodiment of the present disclosure is directed to an electrophotographic component. The electrophotographic component can be selected from the group consisting of a fuser member and a transfix member. An example of an electrophotographic component 200 is illustrated in FIG. 1. The electrophotographic component comprises a substrate 210. An optional cushioning layer 220 can be disposed on the substrate 210. The optional cushioning layer comprises a material selected from the group consisting of silicones, fluorosilicones and fluoroelastomers. An optional release layer 230 is disposed on the substrate and if present, on the optional cushioning layer 220. Optional release layer 230 comprises a fluoropolymer and is positioned at the outermost surface of the electrophotographic component 200. The electrophotographic component comprises at least one layer selected from the optional cushioning layer and the optional release layer. An optional adhesive layer 214 can also be disposed between i) the substrate and ii) at least one layer selected from the optional cushioning layer and the optional release layer. Any of the substrate 210, the optional cushioning layer 220, the optional release layer 230, the optional adhesive layers 214, or any combination thereof, comprises a plurality of fluorinated boron nitride nanosheets 240.

In an embodiment, only the cushioning layer 220 and optionally an adhesive layer 214 are employed on the substrate 210, so that the cushioning layer 220 may be the outermost surface layer. In another embodiment, only the release layer 230 and optionally an adhesive layer 214 are employed on the substrate 210, so that the release layer 230 may be the outermost surface layer. In yet another embodiment, both the cushioning layer 220 and the release layer 230 are employed on the substrate 210, the cushioning layer 220 being disposed between the release layer 230 and the substrate 210, the release layer being the outermost surface layer.

In an embodiment, only the outermost surface layer, whether it is the cushioning layer 220 or the release layer 230, comprises the fluorinated boron nitride nanosheets 240. In an alternative embodiment, only the substrate 210 comprises the fluorinated boron nitride nanosheets 240, while the optional cushioning layer and optional release layer do not include fluorinated boron nitride nanosheets. In another embodiment, all of the substrate 210, cushioning layer 220 and release layer 230 are employed and all comprise the fluorinated boron nitride nanosheets 240. In any of the embodiments listed herein, adhesive layers 214 can be employed with or without the fluorinated boron nitride nanosheets 240.

Fluorinated Boron Nitride Nanosheets

Fluorinated boron nitride nanosheets (F-BNNS's) 240 are chemically resistant and have relatively high thermal conductivity. Further, F-BNNS's exhibit substantially isotropic thermal conduction, especially when compared to crystalline or hexagonal boron nitride, which as discussed above, exhibits anisotropic thermal conductivity.

The nanosheets are considered two-dimensional, having a thickness on the order of a single molecular layer or a few layers of fluorinated boron nitride. For purposes of the present disclosure, the fluorinated boron nitride nanosheets can have any number of molecular layers of fluorinated boron nitride that provides isotropic, or substantially isotropic, thermal conduction. In an embodiment, the fluorinated boron nitride nanosheets include 1 to about 5 molecular layers of fluorinated boron nitride, such as 1 to 3 molecular layers or 1 to 2 molecular layers, or a single molecular layer.

For purposes of the present disclosure, the particle size of the nanosheets is the largest dimension of the particle. The fluorinated boron nitride nanosheets can have any desired average size range. In an embodiment, the fluorinated boron nitride nanosheets have an average particle size ranging from about 1 nanometer to about 1000 nanometers, such as about 2 nanometers to about 500 nanometers, or about 3 nanometers to about 300 nanometers, as determined by TEM measurement.

The fluorinated boron nitride nanosheets can be made using any suitable technique known in the art or hereafter developed. An example of such a method for synthesis of fluorinated boron nitride nanosheets is taught in Radhakrishnan et al., Sci. Adv. 2017; 3:e1700843, Jul. 14, 2017, the disclosure of which is hereby incorporated by reference in its entirety.

The fluorinated boron nitride nanosheets can provide one or more of the following advantages when added to a layer or layers of an electrophotographic component: abrasion resistance, increased longevity, increased thermal conductivity, and improved surface release properties. The fluorinated boron nitride nanosheets can optionally be added to the substrate 210, the cushioning layer 220, the release layer 230, the optional adhesive layers 214, or any combination of these layers, as will be discussed in greater detail below.

Substrate

The substrate can be in any form suitable for the electrophotographic component. For example, the substrate can be in the form of a belt, roll or drum, as is generally well known in the art. In an embodiment, substrate 210 is in the form of an endless belt.

In an embodiment, the substrate 210 comprise a polymer, such as a polyimide. The polymer optionally includes a plurality of fluorinated boron nitride nanosheets 240 dispersed therein. One or more benefits of the fluorinated boron nitride nanosheets may be realized, such as increased thermal diffusivity and/or increased thermal conductivity, compared to the same substrate without the fluorinated boron nitride nanosheets.

Any suitable amount of the fluorinated boron nitride nanosheets can be employed in the substrate 210. As an example, the amount of fluorinated boron nitride nanosheets can range from about 0.01 weight percent to about 20 weight percent, based on the total weight of the substrate, such as from about 0.1 to about 15 weight percent, or from about 1 weight percent to about 10 weight percent, based on the total weight of the substrate (e.g., the weight of the substrate after all drying and curing is completed). In an embodiment, the amount of fluorinated boron nitride nanosheets is less than 20 weight percent, based on the total weight of the substrate 210.

The polyimide of the substrate 210 can be formed by employing a polyamic acid approach that involves mixing at least one dianhydride and at least one diamine, as is well known in the art. The dianhydride and diamine can react in a suitable solvent to yield a corresponding polyamic acid. The polyamic acid can be cyclized to form the polyimide.

Suitable dianhydrides include aromatic dianhydrides and aromatic tetracarboxylic acid dianhydrides such as, for example, 9,9-bis(trifluoromethyl)xanthene-2,3,6,7-tetracarboxylic acid dianhydride, 2,2-bis(3,4-dicarboxyphenyl) hexafluoropropane dianhydride, 2,2-bis((3,4-dicarboxyphenoxy) phenyl)hexafluoropropane dianhydride, 4,4'-bis(3,4-dicarboxy-2,5,6-trifluorophenoxy)octafluorobiphenyl dianhydride, 3,3',4,4'-tetracarboxybiphenyl dianhydride, 3,3',4,4'-tetracarboxybenzophenone dianhydride, di-(4-(3,4-dicarboxyphenoxy)phenyl)ether dianhydride, di-(4-(3,4-dicarboxyphenoxy)phenyl) sulfide dianhydride, di-(3,4-dicarboxyphenyl)methane dianhydride, di-(3,4-dicarboxyphenyl) ether dianhydride, 1,2,4,5-tetracarboxybenzene dianhydride, 1,2,4-tricarboxybenzene dianhydride, butanetetracarboxylic dianhydride, cyclopentanetetracarboxylic dianhydride, pyromellitic dianhydride, 1,2,3,4-benzenetetracarboxylic dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 3,4,9,10-perylenetetracarboxylic dianhydride, 2,3,6,7-anthracene tetracarboxylic dianhydride, 1,2,7,8-phenanthrenetetracarboxylic dianhydride, 3,3',4,4'-biphenyltetracarboxylic dianhydride, 2,2',3,3'-biphenyltetracarboxylic dianhydride, 3,3',4-4'-benzophenonetetracarboxylic dianhydride, 2,2',3,3'-benzophenonetetracarboxylic dianhydride, 2,2-bis(3,4-dicarboxyphenyl)propane dianhydride, 2,2-bis(2,3-dicarboxyphenyl)propane dianhydride, bis(3,4-dicarboxyphenyl)ether dianhydride, bis(2,3-dicarboxyphenyl) ether dianhydride, bis(3,4-dicarboxyphenyl)sulfone dianhydride, bis(2,3-dicarboxyphenyl)sulfone 2,2-bis(3,4-dicarboxyphenyl)-1,1,1,3,3,3-hexafluoropropane dianhydride, 2,2-bis(3,4-dicarboxyphenyl)-1,1,1,3,3,3-hexachloropropane dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3, 4-dicarboxyphenyl)methane dianhydride, 4,4'-(p-phenylenedioxy) diphthalic dianhydride, 4,4'-(m-phenylenedioxy)diphthalic dianhydride, 4,4'-diphenylsulfidedioxybis(4-phthalic acid)dianhydride, 4,4'-diphenylsulfonedioxybis(4-phthalic acid)dianhydride, methylenebis(4-phenyleneoxy-4-phthalic acid)dianhydride, ethylidenebis(4-phenyleneoxy-4-phthalic acid)dianhydride, isopropylidenebis-(4-phenyleneoxy-4-phthalic acid)dianhydride, hexafluoroisopropylidenebis(4-phenyleneoxy-4-phthalic acid)dianhydride, and the like.

Exemplary diamines suitable for use in the preparation of the polyamic acid include 4,4'-bis-(m-aminophenoxy)-biphenyl, 4,4'-bis-(m-aminophenoxy)-diphenyl sulfide, 4,4'-bis-(m-aminophenoxy)-diphenyl sulfone, 4,4'-bis-(p-aminophenoxy)-benzophenone, 4,4'-bis-(p-aminophenoxy)-diphenyl sulfide, 4,4'-bis-(p-aminophenoxy)-diphenyl sulfone, 4,4'-diamino-azobenzene, 4,4'-diaminobiphenyl, 4,4'-diaminodiphenylsulfone, 4,4'-diamino-p-terphenyl, 1,3-bis-(gamma-aminopropyl)-tetramethyl-disiloxane, 1,6-diaminohexane, 4,4'-diaminodiphenylmethane, 3,3'-diaminodiphenylmethane, 1,3-diaminobenzene, 4,4'-diaminodiphenyl ether, 2,4'-diaminodiphenylether, 3,3'-diaminodiphenylether, 3,4'-diaminodiphenylether, 1,4-diaminobenzene, 4,4'-diamino-2,2',3,3',5,5',6,6'-octafluorobiphenyl, 4,4'-diamino-2,2',3,3',5,5',6,6'-octafluorodiphenyl ether, bis[4-(3-aminophenoxy)-phenyl] sulfide, bis[4-(3-aminophenoxy)phenyl] sulfone, bis[4-(3-aminophenoxy) phenyl] ketone, 4,4'-bis(3-aminophenoxy)biphenyl, 2,2-bis[4-(3-aminophenoxy)phenyl]-propane, 2,2-bis[4-(3-aminophenoxy)phenyl]-1,1,1,3,3,3-hexafluoropropane, 4,4'-diaminodiphenyl sulfide, 4,4'-diaminodiphenyl ether, 4,4'-diaminodiphenyl sulfone, 4,4'-diaminodiphenylmethane, 1,1-di(p-aminophenyl)ethane, 2,2-di(p-aminophenyl)propane, and 2,2-di(p-aminophenyl)-1,1,1,3,3,3-hexafluoropropane, and the like and mixtures thereof.

The dianhydrides and diamines are, for example, selected in a weight ratio of from about 20:80 to about 80:20, and more specifically, in an about 50:50 weight ratio. The above aromatic dianhydrides, such as aromatic tetracarboxylic acid dianhydrides, and diamines, such as aromatic diamines, can be used singly or as a mixture.

Examples of well known polyimide precursor dianhydride/diamine mixtures include pyromellitic dianhydride/4, 4'-oxydianiline, pyromellitic dianhydride/phenylenediamine, biphenyl tetracarboxylic dianhydride/4,4'-oxydianiline, biphenyl tetracarboxylic dianhydride/phenylenediamine, benzophenone tetracarboxylic dianhydride/4,4'-oxydianiline, benzophenone tetracarboxylic dianhydride/4,4'-oxydianiline/phenylenediamine, and the like and mixtures thereof.

Commercial examples of polyimide precursors include polyamic acids of pyromellitic dianhydride/4,4-oxydianiline, such as PYRE-ML RC5019 (about 15-16 weight percent in N-methyl-2-pyrrolidone ("NMP")), RC5057 (about 14.5-15.5 weight percent in NMP/aromatic hydrocarbon=80/20), and RC5083 (about 18-19 weight percent in NMP/DMAc=15/85), all from Industrial Summit Technology Corp., Parlin, N.J.; and DURIMIDE® 100, commercially available from FUJIFILM Electronic Materials U.S.A., Inc.

Commercial examples of polyimide precursors also include polyamic acids of biphenyl tetracarboxylic dianhydride/p-benzenedianiline known as U-VARNISH A and U-VARNISH S (about 20 weight in NMP), both from UBE America Inc., New York, N.Y.

Commercial examples of polyimide precursors of biphenyl tetracarboxylic dianhydride/phenylenediamine include PI-2610 (about 10.5 weight in NMP), and PI-2611 (about 13.5 weight in NMP), both from HD MicroSystems, Parlin, N.J.; and BPDA resin (about 16.5 weight in NMP) from Kaneka Corp.

Commercial examples of polyimide precursors of benzophenone tetracarboxylic dianhydride/4,4'-oxydianiline include RP46, and RP50 (about 18 weight percent in NMP), both from Unitech Corp., Hampton, Va.

Commercial examples of polyimide precursors of benzophenone tetracarboxylic dianhydride/4,4'-oxydianiline/phenylenediamine include P1-2525 (about 25 weight percent in NMP), P1-2574 (about 25 weight percent in NMP), P1-2555 (about 19 weight percent in NMP/aromatic hydrocarbon=80/20), and P1-2556 (about 15 weight percent in NMP/aromatic hydrocarbon/propylene glycol methyl ether=70/15/15), all from HD MicroSystems, Parlin, N.J.

Various amounts of polyimide precursors can be selected for the substrate, such as for example, from about 80 to about 99.99 weight percent, from about 90 to about 99.8 weight percent, or from about 95 to about 99 weight percent, based on the total weight of the substrate.

The polymers employed in the polyimide-based substrate can comprise any suitable polyimide repeating units.

Examples of suitable polyimide repeating units are represented by the structures in the parenthesis below:

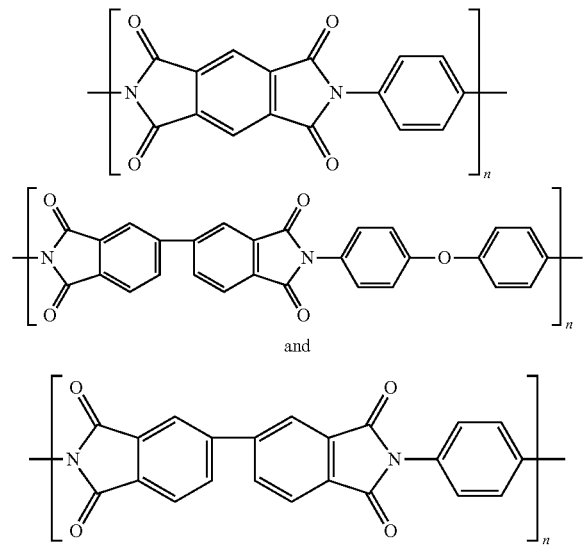

wherein n represents that a variable number of the repeating groups can be employed. In an embodiment, n can be greater than 50 or 100, such as greater than 500, 1000 or greater than 10,000 units, depending on the degree of polymerization. One of ordinary skill in the art would readily be able to determine a desired degree of polymerization for the polyimide material in the substrate.

The polyimide substrate composition can optionally comprise a polysiloxane copolymer to enhance or smooth the coating. The concentration of the polysiloxane copolymer is less than about 1 weight percent or less than about 0.2 weight percent, based on the total weight of the substrate. The optional polysiloxane copolymer includes a polyester modified polydimethylsiloxane, commercially available from BYK Chemical with the trade name of BYK® 310 (about 25 weight percent in xylene) and 370 (about 25 weight percent in xylene/alkylbenzenes/cyclohexanone/monophenylglycol=75/11/7/7); a polyether modified polydimethylsiloxane, commercially available from BYK Chemical with the trade name of BYK® 330 (about 51 weight percent in methoxypropylacetate) and 344 (about 52.3 weight percent in xylene/isobutanol=80/20), BYK®-SILCLEAN 3710 and 3720 (about 25 weight percent in methoxypropanol); a polyacrylate modified polydimethylsiloxane, commercially available from BYK Chemical with the trade name of BYK®-SILCLEAN 3700 (about 25 weight percent in methoxypropylacetate); or a polyester polyether modified polydimethylsiloxane, commercially available from BYK Chemical with the trade name of BYK® 375 (about 25 weight percent in Di-propylene glycol monomethyl ether).

Conductive or non-conductive fillers may optionally be present in the polyimide substrate and/or any of the other layers, including the cushioning layer, surface layer or adhesive layers. Example fillers include carbon blacks, aluminum nitride, boron nitride (e.g., non-fluorinated boron nitride particles), aluminum oxide, graphite, graphene, copper flakes, nano diamond, carbon nanotubes, metal oxides, doped metal oxides, metal flakes, and mixtures thereof. In various embodiments, other additives known to one of ordinary skill in the art can also be included to form the disclosed composite materials.

In an embodiment, the disclosed polyimide substrate 210 possesses a Young's modulus of from about 4,000 MPa to about 10,000 MPa, or from about 5,000 MPa to about 10,000 MPa, or from about 6,000 MPA to about 10,000 MPa; and an onset decomposition temperature of from about 400° C. to about 600° C., or from about 425° C. to about 575° C., or from about 450° C. to about 550° C.

The polyimide substrate can be made by any suitable method. A variety of suitable techniques for making such substrates are well known in the art. An example of a suitable technique for making the substrate is disclosed in U.S. Patent Publication 2015/0086798, filed on Sep. 20, 2013, as application Ser. No. 14/032,446, the disclosure of which is herein incorporated by reference in its entirety.

Figure 4A:
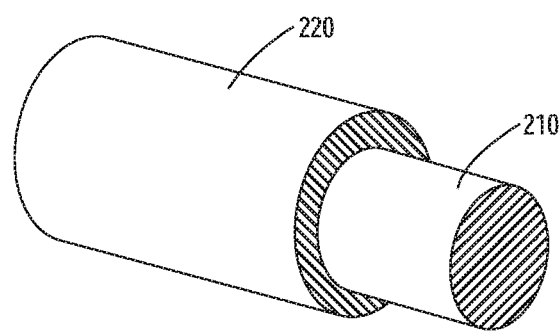
FIG. 4A depicts a fuser roll, according to an embodiment of the present disclosure.
Figure 4B:
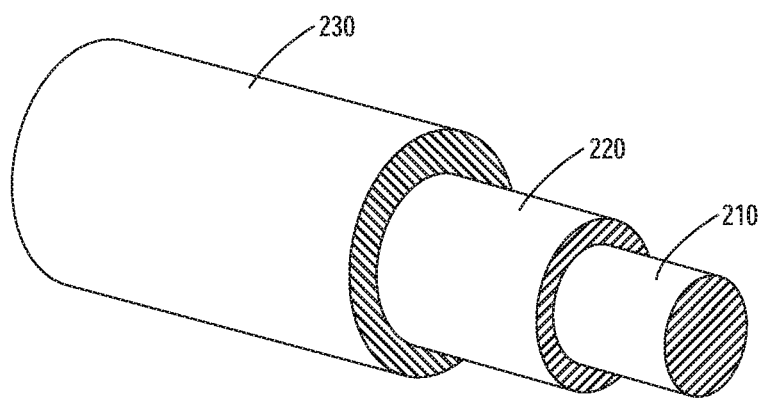
FIG. 4B depicts a fuser roll, according to an embodiment of the present disclosure.

In embodiments, the electrophotographic component 200 is in the form of a roll or drum. In such embodiments, substrate 210 can be a cylindrical substrate taking the form of a cylindrical tube, e.g., having a hollow structure including a heating lamp therein, or a solid cylindrical shaft. FIGS. 4A and 4B, discussed in greater detail below, show an example substrate 210 in the form of a solid cylindrical shaft. The cylindrical substrate can be made of a material including, but not limited to, a metal, a polymer (e.g., plastic), and/or a ceramic. For example, the metal can include aluminum, anodized aluminum, steel, nickel, and/or copper. The plastic can include, for example, polyimide, polyester, polyketone such as polyetheretherketone (PEEK), poly(arylene ether), polyamide, polyaramide, polyetherimide, polyphthalamide, polyamideimide, polyphenylene sulfide, fluoropolyimide and/or fluoropolyurethane. In an embodiment, if the substrate is metal, it does not include the above described fluorinated boron nitride nanosheets described herein.

Optional Cushioning Layer

Examples of materials used for the cushioning layer 220 include silicones, fluorosilicones and fluoroelastomers. Silicones can include silicone rubbers such as room temperature vulcanization (RTV) silicone rubbers, high temperature vulcanization (HTV) silicone rubbers, and low temperature vulcanization (LTV) silicone rubbers. These rubbers are known and readily available commercially, such as SILASTIC® 735 black RTV and SILASTIC® 732 RTV, both from Dow Corning; 106 RTV Silicone Rubber and 90 RTV Silicone Rubber, both from General Electric; and JCR6115CLEAR HTV and SE4705U HTV silicone rubbers from Dow Corning Toray Silicones. Other suitable silicone and fluorosilicone materials include siloxanes (such as polydimethylsiloxanes); fluorosilicones such as Silicone Rubber 552, available from Sampson Coatings, Richmond, Va.; liquid silicone rubbers such as vinyl cross-linked heat curable rubbers or silanol room temperature cross-linked materials; and the like. Another specific example is Dow Corning SYLGARD 182. Commercially available LSR rubbers include Dow Corning Q3-6395, Q3-6396, SILASTIC® 590 LSR, SILASTIC® 591 LSR, SILASTIC® 595 LSR, SILASTIC® 596 LSR, and SILASTIC® 598 LSR from Dow Corning. The functional layers provide elasticity and can be mixed with inorganic particles, for example SiC or $Al_2O_3$, as desired.

Other materials suitable for use as functional cushioning layer 220 also include fluoroelastomers. Example fluoroelastomers are from the class of 1) copolymers of two of vinylidenefluoride, hexafluoropropylene, and tetrafluoroethylene; 2) terpolymers of vinylidenefluoride, hexafluoropropylene, and tetrafluoroethylene; and 3) tetrapolymers of vinylidenefluoride, hexafluoropropylene, tetrafluoroethylene, and a cure site monomer. These fluoroelastomers are known commercially under various designations such as VITON A®, VITON B®, VITON E®, VITON E 60C®, VITON E430®, VITON 910®, VITON GH®; VITON GF®; and VITON ETP®. The VITON® designation is a trademark of E.I. DuPont de Nemours, Inc.

The cure site monomer can be 4-bromoperfluorobutene-1; 1,1-dihydro-4-bromoperfluorobutene-1; 3-bromoperfluoropropene-1; 1,1-dihydro-3-bromoperfluoropropene-1, or any other suitable, known cure site monomer, such as those commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a registered trademark of 3M Company. Additional commercially available materials include AFLAStm a poly(propylene-tetrafluoroethylene), and FLUOREL II® (LII900) a poly(propylene-tetrafluoroethylenevinylidenefluoride), both also available from 3M Company, as well as the Tecnoflons identified as FOR-60KIR®, FOR-LHF®, NM® FOR-THF®, FOR-TFS®, TH®, NH®, P757®, TNS®, T439®, PL958®, BR9151® and TN505®, available from Ausimont.

The fluoroelastomers VITON GH® and VITON GF® have relatively low amounts of vinylidenefluoride. For example, the VITON GF® and VITON GH® have about 35 weight percent of vinylidenefluoride, about 34 weight percent of hexafluoropropylene, and about 29 weight percent of tetrafluoroethylene, with about 2 weight percent cure site monomer.

As discussed above, the cushioning layer 220 can optionally include a plurality of fluorinated boron nitride nanosheets 240 dispersed therein. One or more benefits of the fluorinated boron nitride nanosheets may be realized, such as increased thermal conductivity, increased hardness and/or increased longevity, compared to the same cushioning layer without the fluorinated boron nitride nanosheets. If the cushioning layer is the outermost surface layer of the electrophotographic component, the cushioning layer may also have improved release properties compared to the same cushioning layer having the same amount of non-fluorinated particles, such as non-fluorinated oxide filler or a non-fluorinated boron nitride filler.

Any suitable amount of the fluorinated boron nitride nanosheets can be employed in the cushioning layer 220. As an example, the amount of fluorinated boron nitride nanosheets can range from about 0.01 weight percent to about 20 weight percent, such as from about 0.1 to about 15 weight percent, or from about 1 weight percent to about 10 weight percent, based on the total weight of the cushioning layer (e.g., weight of the cushioning layer after all drying and/or curing is completed). In an embodiment, the amount of fluorinated boron nitride nanosheets is less than 20 weight percent, based on the total weight of the cushioning layer.

The thickness of the functional cushioning layer 220 is from about 30 microns to about 1,000 microns, or from about 100 microns to about 800 microns, or from about 150 microns to about 500 microns.

Optional Release Layer

An exemplary embodiment of a release layer 230 includes fluoropolymer materials. Fluoropolymer materials suitable for use in the formulation described herein include fluorine-containing polymers. These polymers include fluoropolymers comprising a monomeric repeat unit that is selected from the group consisting of vinylidene fluoride, hexafluoropropylene, tetrafluoroethylene, perfluoroalkylvinylether, and mixtures thereof. The fluoropolymers may include linear or branched polymers, and cross-linked fluoroelastomers. Examples of fluoropolymer include polytetrafluoroethylene (PTFE); perfluoroalkoxy polymer resin (PFA); copolymers of tetrafluoroethylene (TFE) and hexafluoropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP), and mixtures thereof. The fluoropolymer materials provide chemical and thermal stability and have a low surface energy. The fluoropolymer materials have a melting temperature of from about 255° C. to about 360° C. or from about 280° C. to about 330° C. These particles are melted to form the release layer.

As discussed above, the release layer 230 can optionally include a plurality of fluorinated boron nitride nanosheets 240 dispersed therein. One or more benefits of including the fluorinated boron nitride nanosheets may be realized, such as increased thermal conductivity, increased hardness and/or increased longevity, compared to the same release layer without the fluorinated boron nitride nanosheets. The release layer may also have improved release properties compared to the same release layer having the same amount of non-fluorinated particles, such as non-fluorinated oxide filler or a non-fluorinated boron nitride filler.

Any suitable amount of the fluorinated boron nitride nanosheets can be employed in the release layer 230. As an example, the amount of fluorinated boron nitride nanosheets can range from about 0.01 weight percent to about 20 weight percent, such as from about 0.1 to about 15 weight percent, or from about 1 weight percent to about 10 weight percent, based on the total weight of the release layer (e.g., weight of release layer after all drying and/or curing is completed). In an embodiment, the amount of fluorinated boron nitride nanosheets is less than 20 weight percent, based on the total weight of the release layer 230.

For the electrophotographic component 200, the thickness of the outer surface layer or release layer 230 can be from about 10 microns to about 100 microns, or from about 20 microns to about 80 microns, or from about 40 microns to about 60 microns.

Optional Adhesive Layer(s)

As illustrated in FIG. 1, any known or later developed adhesive layers 214, also referred to as a primer layer, may optionally be positioned between any two or all three of the release layer 230, the functional cushioning layer 220 and the substrate 210. Examples of suitable, well known adhesives include silanes such as amino silanes (such as, for example, HV Primer 10 from Dow Corning), titanates, zirconates, alum inates, and the like, and mixtures thereof.

The adhesive layers 214 can optionally include a plurality of fluorinated boron nitride nanosheets 240 dispersed therein. One or more benefits of the fluorinated boron nitride nanosheets may be realized, such as increased thermal conductivity and/or increased longevity, compared to the same adhesive layer without the fluorinated boron nitride nanosheets.

Any suitable amount of the fluorinated boron nitride nanosheets can be employed in the adhesive layers 214. As an example, the amount of fluorinated boron nitride nanosheets can range from about 0.01 weight percent to about 20 weight percent, such as from about 0.1 to about 15 weight percent, or from about 1 weight percent to about 10 weight percent, based on the total weight of the adhesive layers (e.g., weight of adhesive layer after all drying and/or curing is completed). In an embodiment, the amount of fluorinated boron nitride nanosheets is less than 20 weight percent, based on the total weight of the adhesive layer.

In an embodiment, the adhesive is applied in a diluted form of, for example, about 0.001 percent to about 10 percent adhesive in a solvent or other diluent. The adhesive can be coated on the substrate, or on the cushioning layer, to a thickness of from about 2 nanometers to about 2,000 nanometers, or from about 2 nanometers to about 500 nanometers. The adhesive can be coated by any suitable known technique, including spray coating or wiping.

Figure 2A:
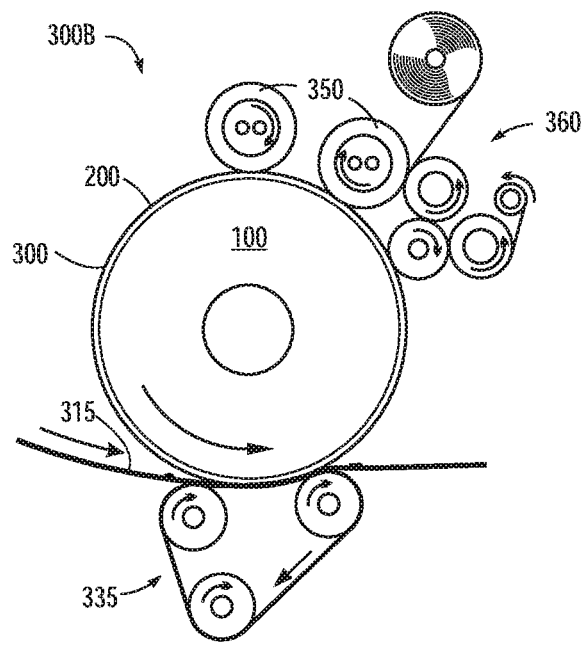
FIG. 2A depicts an exemplary fusing configuration using the electrophotographic component shown in FIG. 1, according to an embodiment of the present disclosure.
Figure 2B:
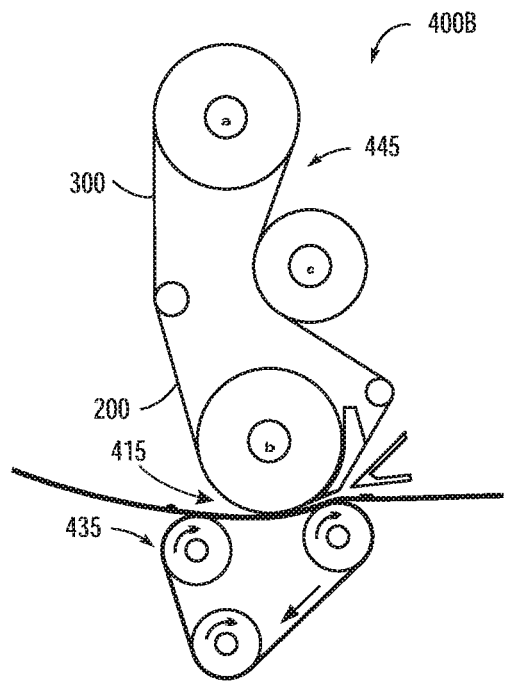
FIG. 2B depicts an exemplary fusing configuration using the electrophotographic component shown in FIG. 1, according to an embodiment of the present disclosure.

FIGS. 2A and 2B depict exemplary configurations for the electrophotographic component 200 in accordance with the present teachings. In particular, FIGS. 2A and 2B illustrate schematic views of a fuser belt 300 in various configurations. It should be readily apparent to one of ordinary skill in the art that the fusing configurations 300B and 400B depicted in FIGS. 2A-2B, respectively, represent generalized schematic illustrations and that other members/layers/substrates/configurations can be added or existing members/layers/substrates/configurations can be removed or modified. Although an electrophotographic printer is described herein, the disclosed apparatus and method can be applied to other printing technologies. Examples include offset printing, inkjet printing and solid transfix machines.

FIG. 2A depicts the fusing configuration 300B using the fuser belt 300 positioned on the surface of a drum. The fuser belt 300 can be in the form of an endless belt and has a cross section comprising a substrate 210, optional cushioning layer 220, optional release layer 230, and adhesive layers 214, as shown in FIG. 1, in accordance with an embodiment of the present teachings. The fuser belt 300 forms a fuser nip with a pressure applying mechanism 335, such as a pressure belt, for an image supporting material 315. In various embodiments, the pressure applying mechanism 335 can be used in combination with a heat lamp (not shown) to provide both the pressure and heat for the fusing process of the toner particles on the image supporting material 315. In addition, the configuration 300B can include one or more external heat rolls 350 along with, e.g., a cleaning web 360, as shown in FIG. 2A.

FIG. 2B depicts the fusing configuration 400B using the fuser belt 300, which can be in the form of an endless belt, as illustrated. Fuser belt 300 has a cross section comprising a substrate 210, optional cushioning layer 220, optional release layer 230 and optional adhesive layer 214, as shown in FIG. 1, in accordance with an embodiment of the present teachings. The configuration 400B employs the fuser belt 300 in a manner so that it forms a fuser nip with a pressure applying mechanism 435, such as a pressure belt in FIG. 2B, for a media substrate 415. In various embodiments, the pressure applying mechanism 435 can be used in a combination with a heat lamp to provide both the pressure and heat for the fusing process of the toner particles on the media substrate 415. In addition, the configuration 400B can include a mechanical system 445 to move the fuser belt 300 and thus fusing the toner particles and forming images on the media substrate 415. The mechanical system 445 can include one or more rolls 445a-c, which can also be used as heat rolls when needed.

Figure 3:
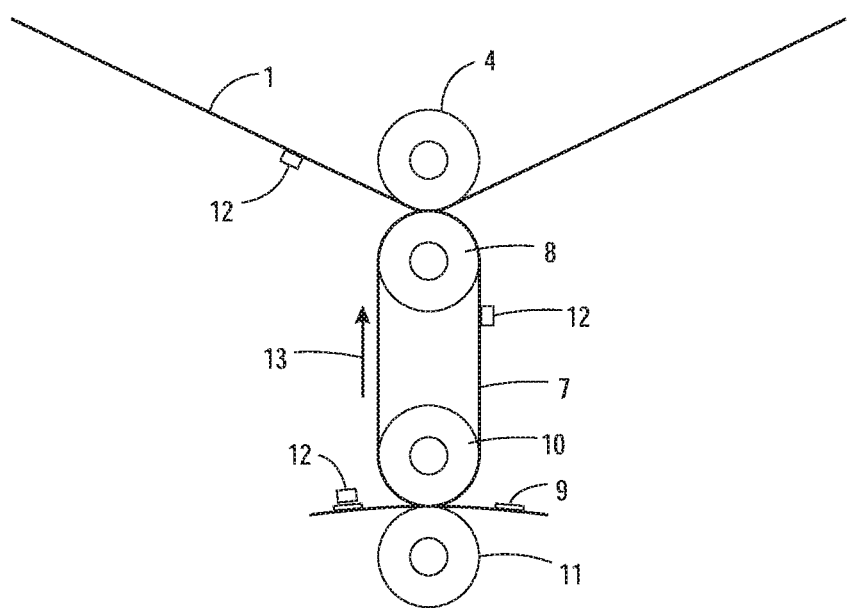
FIG. 3 depicts a fuser configuration using a transfix apparatus, according to an embodiment of the present disclosure.

FIG. 3 demonstrates a view of an embodiment of a transfix member 7, which may be in the form of a belt (e.g., an endless belt), sheet, film, or like form. The transfix member 7 is constructed similarly to the electrophotographic component 200 described above. The developed image 12 positioned on intermediate transfer member 1, is brought into contact with and transferred to transfix member 7 via rollers 4 and 8. Roller 4 and/or roller 8 may or may not have heat associated therewith. Transfix member 7 proceeds in the direction of arrow 13. The developed image is transferred and fused to a copy substrate 9 as copy substrate 9 is advanced between rollers 10 and 11. Rollers 10 and/or 11 may or may not have heat associated therewith.

FIGS. 4A and 4B illustrate an electrophotographic component in the form of a roll, such as a fuser roll or a transfix roll. Substrate 210 is in the form of a cylindrical shaft and can comprise any of the materials discussed herein for a cylindrical substrate. As illustrated in FIG. 4A, the cushioning layer 220 can be formed directly on the substrate 210 and can be the outermost layer. For example, the cushioning layer can be a fluoroelastomer, such as any of the VITON materials described herein. Alternatively, the cushioning layer 220 in FIG. 4A could be replaced by any of the release layers 230 described herein.

FIG. 4B illustrated both a cushioning layer 220 and a release layer 230 on the substrate 210, according to an embodiment of the present disclosure. In another example, the exemplary electrophotographic components of FIGS. 4A and 4B can include an adhesive layer (not shown), for example, formed between the cushioning layer 220 and the substrate 210 and/or between the cushioning layer 220 and the release layer 230.

Another embodiment of the present disclosure is directed to an endless belt. The endless belt comprises a substrate, such as substrate 210 described above with reference to FIG. 1. The endless belt can comprise any of the materials in any of the same amounts as described above for making substrate 210, including polymer materials, fluorinated boron nitride nanosheets and other materials. The endless belt and any of the substrates described herein can be formed using suitable materials that are non-conductive or conductive depending on a specific configuration, for example, as shown in FIG. 1.

The endless belt can be fabricated as a standalone belt that can be employed with or without additional layers. For example, the endless belt can include, for example, a substrate with one or more cushioning and/or release layers formed thereon, as shown in FIG. 1.

Specific examples will now be described in detail. These examples are intended to be illustrative, and not limited to the materials, conditions, or process parameters set forth in these embodiments. All parts are percentages by solid weight unless otherwise indicated.

EXAMPLES

Prophetic Example 1

A polyamic acid of biphenyl tetracarboxylic dianhydride/p-benzenedianiline (BPDA resin from Kaneka, about 16.6 wt % in NMP) is mixed with fluorinated boron nitride nanosheets (F-BNNS's) and additional NMP solvent with a high shear mixer at the weight ratio of the solid components of 99/1. After coating and subsequent curing, a F-BNNS/polyimide composite belt is obtained for fuser belt applications. Although not reduced into practice yet, it is believed that one or more of the thermal conductivity, abrasion resistance, and longevity of the polyimide fuser belt will be significantly improved.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including", "includes", "having", "has", "with" or variants thereof are used in either the detailed description and the claims, such terms are intended to be inclusive in a manner similar to the term "comprising". Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. An electrophotographic component comprising:
   a substrate;
   an optional cushioning layer disposed on the substrate, the optional cushioning layer comprising a material selected from the group consisting of silicones, fluorosilicones and fluoroelastomers; and
   an optional release layer disposed on the substrate and if present, on the optional cushioning layer, the optional release layer comprising a fluoropolymer,
   wherein the substrate, the optional cushioning layer, the optional release layer, or any combination thereof, comprise a plurality of fluorinated boron nitride nanosheets; and
   wherein the electrophotographic component comprises at least one layer selected from the optional cushioning layer and the optional release layer.

2. The electrophotographic component of claim 1, wherein the fluorinated boron nitride nanosheets have a particle size ranging of from about 1 nanometer to about 1000 nanometers, as determined by TEM measurement.

3. The electrophotographic component of claim 1, wherein the fluorinated boron nitride nanosheets comprise from 1 molecular layer to about 5 molecular layers of fluorinated boron nitride.

4. The electrophotographic component of claim 1, wherein the electrophotographic component is in the form of an endless belt, the electrophotographic component being a fuser member or a transfix member.

5. The electrophotographic component of claim 4, wherein the substrate comprises a polymer and the fluorinated boron nitride nanosheets, the amount of fluorinated boron nitride nanosheets ranging from about 0.01 wt. % to about 20 wt. %, based on the total weight of the substrate.

6. The electrophotographic component of claim 4, wherein the electrophotographic component comprises the release layer, the release layer comprising an amount of fluorinated boron nitride nanosheets ranging from about 0.01 wt. % to about 20 wt. %, based on the total weight of the release layer.

7. The electrophotographic component of claim 4, wherein the electrophotographic component comprises the cushioning layer, the cushioning layer comprising an amount of fluorinated boron nitride nanosheets ranging from about 0.01 wt. % to about 20 wt. %, based on the total weight of the cushioning layer.

8. The electrophotographic component of claim 1, wherein the electrophotographic component is a fuser or a transfix member in the form of a roll or drum.

9. The electrophotographic component of claim 8, wherein the substrate is a cylindrical substrate.

10. The electrophotographic component of claim 8, wherein the electrophotographic component comprises the release layer, the release layer comprising an amount of fluorinated boron nitride nanosheets ranging from about 0.01 wt. % to about 20 wt. %, based on the total weight of the release layer.

11. The electrophotographic component of claim 8, wherein the electrophotographic component comprises the cushioning layer, the cushioning layer comprising an amount of fluorinated boron nitride nanosheets ranging from about 0.01 wt. % to about 20 wt. %, based on the total weight of the cushioning layer.

12. The electrophotographic component of claim 1, further comprising an adhesive layer disposed between i) the substrate and ii) at least one layer selected from the optional cushioning layer and the optional release layer.

13. An endless belt comprising a polymer and a plurality of fluorinated boron nitride nanosheets dispersed in the polymer.

14. The endless belt of claim 13, wherein the polymer is a polyimide.

15. The endless belt of claim 14, wherein polyimide is made from precursors comprising at least one dianhydride and at least one diamine.

16. The endless belt of claim 15, wherein the dianhydride is selected from the group consisting of pyromellitic dianhydride and biphenyl tetracarboxylic dianhydride; and the diamine is selected from the group consisting of 4,4-oxydianiline and p-diaminobenzene.

17. The endless belt of claim 13, wherein the fluorinated boron nitride nanosheets have a particle size ranging of from about 1 nanometer to about 1000 nanometers, as determined by TEM measurement.

18. The endless belt of claim 13, wherein the fluorinated boron nitride nanosheets comprise from 1 molecular layer to about 5 molecular layers of fluorinated boron nitride.

19. The endless belt of claim 13, wherein the amount of fluorinated boron nitride nanosheets ranges from about 0.01 wt. % to about 20 wt. %, based on the total weight of the endless belt.

20. The endless belt of claim 13, further comprising at least one filler selected from the group consisting of aluminum nitride, boron nitride, aluminum oxide, graphite, graphene, copper flakes, nano diamond, carbon blacks, carbon nanotubes, metal oxides, doped metal oxide and metal flakes.

* * * * *